United States Patent [19]

Lee et al.

[11] Patent Number: 5,124,212

[45] Date of Patent: Jun. 23, 1992

[54] ARTICLES PREPARED FROM FAST ULTRAVIOLET RADIATION CURING SILICONE COMPOSITION

[75] Inventors: Chi-long Lee; Michael A. Lutz, both of Midland, Mich.

[73] Assignee: Dow Corning Corporation, Midland, Mich.

[21] Appl. No.: 494,720

[22] Filed: Mar. 16, 1990

Related U.S. Application Data

[60] Division of Ser. No. 151,748, Apr. 18, 1988, Pat. No. 4,946,874, which is a continuation-in-part of Ser. No. 545,729, Oct. 26, 1983, abandoned.

[51] Int. Cl.⁵ .................... B32B 9/04; B32B 17/02; B32B 17/10
[52] U.S. Cl. ...................... 428/429; 428/447
[58] Field of Search .................. 428/429, 447

[56] References Cited

U.S. PATENT DOCUMENTS

| | | | |
|---|---|---|---|
| 3,816,282 | 6/1974 | Viventi | 204/159.13 |
| 3,873,499 | 3/1975 | Michael et al. | 260/46.5 D |
| 3,874,376 | 3/1975 | Dart et al. | 128/90 |
| 4,052,529 | 10/1977 | Bakerman et al. | 428/537 |
| 4,057,431 | 10/1977 | Finelli et al. | 96/115 R |
| 4,064,027 | 12/1977 | Gant | 522/172 |
| 4,303,484 | 12/1981 | Takamizawa et al. | 204/159.13 |
| 4,308,400 | 12/1981 | Felder et al. | 568/336 |
| 4,347,111 | 8/1982 | Gehlhaus et al. | 204/159.16 |
| 4,364,809 | 2/1982 | Sato et al. | 204/159.13 |
| 4,499,175 | 2/1985 | Curtis et al. | 430/253 |
| 4,780,486 | 10/1988 | Lee et al. | 522/14 |
| 4,923,754 | 5/1990 | Lee et al. | 428/429 |
| 4,946,874 | 8/1990 | Lee et al. | 522/14 |

FOREIGN PATENT DOCUMENTS

| | | |
|---|---|---|
| 61386 | 6/1975 | Japan . |
| 1433461 | 7/1976 | United Kingdom . |

*Primary Examiner*—Jacob Ziegler
*Attorney, Agent, or Firm*—Roger H. Borrousch

[57] ABSTRACT

Compositions which cure by UV radiation in less than one second are obtained by mixing an alkenyl containing polydiorganosiloxane, a mercapto functional crosslinker of the mercapto functional polyorganosiloxane or mercapto organic compounds, a photosensitizer, a viscosity stabilizer, and optionally a reinforcing agent. These compositions can be packaged in one container and can be used as the primary coating for optical fibers.

4 Claims, No Drawings

ARTICLES PREPARED FROM FAST ULTRAVIOLET RADIATION CURING SILICONE COMPOSITION

This is a divisional of copending application Ser. No. 07/151,748 filed on Apr. 18, 1988 now U.S. Pat. No. 4,946,874, which application is a continuation-in-part of application Ser. No. 545,729, filed Oct. 26, 1983, abandoned.

BACKGROUND OF THE INVENTION

1. Field of the Invention

This invention relates to a silicone composition which rapidly cures when exposed to ultraviolet radiation (UV).

2. Description of the Prior Art

UV curable silicone compositions are known in the art. Silicone compositions which can be cured by exposure to UV radiation include two types of curing reactions. One such reaction is a reaction of an alkenyl-containing polyorgano-siloxane with an organosiloxane containing silicon-bonded hydrogen atoms in the presence of a UV photoinitiator. Another such reaction is a reaction of an alkenyl-containing polyorganosiloxane with a mercapto functional polyorgano-siloxane in the presence of a UV photoinitiator.

One use of UV curable silicone compositions would be to coat optical fibers. The optical fiber industry appears to desire coatings which can be applied from one package, storage stable compositions which rapidly cure upon exposure to UV radiation to give a coating with a predetermined refractive index. Making such compositions is a challenge because getting one property into an acceptable range frequently causes another property to become unacceptable. An object of this invention is to provide a composition which meets the accepted and desired property profile as stated above.

SUMMARY OF THE INVENTION

This invention relates to a composition comprising a material which is storable in one package, is viscosity stable indicated by the failure of the 25° C. viscosity to double when heated at 100° C. for 24 hours, cures when exposed to ultraviolet radiation of 70 millijoules or less per square centimeter in one second or less where the ultraviolet radiation includes a wavelength of 365 nanometers and is obtained by mixing (A) alkenyl functional, linear triorganosiloxy endblocked polydiorganosiloxane having a degree of polymerization of 30 to 1,000 where each silicon-bonded organic radical is selected from vinyl, methyl, phenyl, 3,3,3-trifluoropropyl, beta-(cyclohexenyl)ethyl, ethyl, cyclohexenyl, allyl, higher alkenyl radicals represented by the formula $-R^*(CH_2)_tCH=CH_2$ wherein $R^*$ is $-(CH_2)_s-$ or $-(CH_2)_tCH=CH-$, r has a value of 1, 2, or 3; s has a value of 3 or 6; and t has a value of 3, 4, or 5, and silacyclopentenyl and having per molecule at least two silicon-bonded organic radicals selected from vinyl, beta-(cyclohexenyl)ethyl, cyclohexenyl allyl, higher alkenyl radical and silacyclopentenyl, (B) mercapto functional crosslinker which is at least one material selected from mercapto functional polyorganosiloxanes and mercapto organic compounds, said mercapto functional polyorganosiloxanes are represented by the general formula

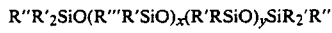

$R''R'_2SiO(R'''R'SiO)_x(R'RSiO)_ySiR_2'R''$ wherein each R is selected from mercaptoalkyl radicals having from 2 to 6 carbon atoms per radical: each R' is selected from methyl, phenyl, 3,3,3-trifluoropropyl, and ethyl; and each R'' is selected from the radicals of —OH, R, and R'; and each R''' is selected from methyl and phenyl, on the average there being per molecule at least two mercaptoalkyl radicals, x is 0 or greater, y is 0 or greater, and the amount and kind of organic radicals represented by R, R', R'', and R''' being of such a nature as to make (A) and (B) compatible, and said mercapto organic compounds have at least two mercapto groups per molecule, consisting of atoms of sulfur, carbon, and hydrogen, and optionally oxygen, having a molecular weight less than 1,000, and being of such a nature as to make (A) and (B) compatible, (C) photosensitizer, (D) storage stabilizer, and (E) optionally reinforcing agent, there being in said material from 0.5 to 1.5 total alkenyl radicals per mercapto group.

DETAILED DESCRIPTION OF THE INVENTION

The compositions of this invention have a definite property profile covering both the uncured and cured states which permits them to be useful in coating optical fibers particularly as the primary coat.

The compositions which are encompassed in this invention are those defined as one package compositions. For purposes of this invention, "one package compositions" means all of the ingredients can be combined and then stored in a single package until cure is desired, at which time the material can be removed from the storage container, exposed to curing conditions, and it will cure to substantially the same property state after storage as it will prior to storage.

The compositions which are encompassed in this invention also do not double in 25° C. viscosity when heated at 100° C. for 24 hours, preferably they do not double in 25° C. viscosity when heated at 100° C. for seven days. The term "25° C. viscosity" means that the viscosity being discussed is the viscosity as measured at 25° C. Such a property is important because in certain, in fact most, coating methods the composition will be exposed to high temperatures of hot optical fibers and because continuous coating methods are preferred and the most economical. If the 25° C. viscosity were to vary widely after heating which indicates that the composition is unstable, the coating thickness could vary by an unacceptable degree and in the most severe case the composition could gel.

The compositions which are encompassed in this invention can be cured by exposure to ultraviolet radiation which includes a wavelength of 365 nanometers in one second or less and 70 millijoules or less per square centimeter. This limitation expresses the fast curing nature of these compositions. Compositions which require larger energies or longer times to cure may find usefulness for certain applications but for purposes of this invention fast curing is necessary for todays manufacture of optical fibers. Compositions of this invention will cure in short periods of time using a medium pressure mercury vapor lamp. These cure times are short such as less than 0.3 second, preferably 0.1 second or less, when exposed to UV radiation to provide 70 millijoules or less per square centimeter of coating surface. Sources of UV provide a spectrum of wavelengths, but include the 365 nanometer wavelength for this invention. The UV source can be a mercury vapor lamp or other such known UV sources.

The compositions which are preferred and encompassed by this invention are those which are useful as primary coatings for optical fibers. Such compositions which exhibit a refractive index of less than 1.45 are useful for reflective type coatings on optical fiber and those which exhibit a refractive index of greater than 1.48 are useful for dispersive type coatings on optical fiber. The refractive index used is that measured with sodium D line of 5893 Å at 25° C.

The compositions of this invention are made by mixing the following ingredients: (A) alkenyl functional linear triorganosiloxy endblocked polydiorganosiloxane, (B) mercapto functional crosslinker (C) photosensitizer, (D) storage stabilizer, and (E) optionally reinforcing agent.

Polydiorganosiloxane, (A), is substantially linear. In the manufacture of such polymers some branching can occur. however, the amounts are usually very small and do not detract from the basic linear nature of the polymer chain. The silicon-bonded organic radicals can be vinyl, methyl, phenyl, 3,3,3trifluoropropyl, ethyl, beta-(cyclohexenyl)ethyl, cyclohexenyl, allyl, higher alkenyl radicals, and silacyclopentenyl, (A) should have at least two alkenyl radicals per molecule selected from vinyl allyl, beta(cyclohexenyl)ethyl, cyclohexenyl, higher alkenyl, and silacyclopentenyl. Because of availability and economical considerations, the silicon-bonded organic radicals are preferably combinations of vinyl, methyl, and phenyl. The degree of polymerization for (A) is from 30 to 1,000, preferably 50 to 500, repeating siloxane units per average molecule.

Polydiorganosiloxanes of (A) which contain higher alkenyl radicals have at least two siloxane units of the following general formula

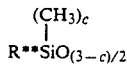

wherein c is 1 or 2 and $R^{**}$ is an unsaturated radical. (A) can be a copolymer of the siloxane units and siloxane units having methyl, phenyl, ethyl, and 3,3,3-trifluoropropyl. Preferably, at least 50 percent of the organic radicals are methyl.

The higher alkenyl radicals of $R^{**}$ can be selected from the group consisting of alkenyl radicals represented by the formula $-R^*(CH_2)_rCH=CH_2$ wherein $R^*$ is $-(CH_2)_s-$ or $-(CH_2)_tCH=CH-$, r has the value of 1, 2, or 3; s has the value of 3 or 6; and t has the value of 3 4, or 5. While the odor emitted upon UV curing is significantly decreased when at least 50 mole percent of the unsaturated radicals are higher alkenyl radicals, it is even more preferred that essentially all the unsaturated radicals be higher alkenyl radicals to further reduce or eliminate the emission of odor.

The higher alkenyl radicals represented by the formula $-R^*(CH_2)_rCH=CH_2$ contain at least 6 carbon atoms. For example, when $R^*$ is $-(CH_2)_s-$, the higher alkenyl radicals include 5-hexenyl, 6-heptenyl, 7-octenyl, 8-nonenyl, 9-decenyl, and 10-undecenyl. When $R^*$ is $-(CH_2)_tCH=CH_2-$, the higher alkenyl radicals include, among others, 4,7-octadienyl, 5,8-nonadienyl, 5,9g-decadienyl, 6,11-dodecadienyl and 4,8-nonadienyl. Alkenyl radicals selected from the group consisting of 5-hexenyl, 7-octenyl, 9-decenyl, and 5,9-decadienyl are preferred because of the more ready availability of the α,ω-dienes used to prepare the alkenylsiloxanes. It is more preferred that $R^*$ denote $-(CH_2)_s-$ so that the radicals contain only terminal unsaturation and it is most preferred that $R^*$ is the 5-hexenyl radical.

When higher alkenyl radicals are present in the polydiorganosiloxane of (A), it is preferred that the units be selected from the group consisting of dimethylsiloxane units, trimethylsiloxane units, alkenylmethylsiloxane units, methylphenylsiloxane units, diphenylsiloxane units, and alkenyldimethylsiloxane units. Examples of siloxane units which form the polydiorganosiloxane (A) of this invention include trimethylsiloxane units, dimethylsiloxane units, 5-hexenyldimethylsiloxane units, 5-hexenylmethylsiloxane units, dimethylvinylsiloxane units, methylvinylsiloxane units, dimethyl-7-octenylsiloxane units, methyl-7-octenylsiloxane units, diphenylsiloxane units, methylphenylsiloxane units, 9-decenyldimethylsiloxane units, 9-decenylmethylsiloxane units, 5,9g-decadienyldimethylsiloxane units, 6-heptenylmethylsiloxane units, and dimethyl-8-nonenylsiloxane units.

Specific examples of (A) when the polydiorganosiloxane contains higher alkenyl radicals for purposes of illustration include $ViMe_2SiO(Me_2SiO)_{100}(HexMeSiO)_2SiMe_2Vi$, $ViMe_2SiO(Me_2SiO)_{200}(HexMeSiO)_{10}SiMe_2Vi$, $HexMe_2SiO(Me_2SiO)_{150}(HexMeSiO)_4SiMe_2Hex$, $Me_3SiO(Me_2SiO)_{10}(HexMeSiO)_5SiMe_3$, $HexMe_2SiOSiMe_2Hex$, $Me_3SiO(HexMeSiO)_{10}SiMe_3$ and $HexMe_2SiO(Me_2SiO)_{150}SiMe_2Hex$ where Me is the methyl radical, Hex is the 5-hexenyl radical, and Vi is the vinyl radical.

The higher alkenyl radical containing polydiorganosiloxane of (A) that are used in the coating composition of this invention can be prepared by several methods. For example, known siloxanes bearing reactive groups such as SiH may be reacted with an α,ω-diene such as 1,5-hexadiene. Alternatively, suitable olefinic organosiloxanes may be prepared from alkenyl substituted silanes or siloxanes using well known methods of hydrolysis and equilibration. It is usually preferred to prepare olefinic siloxanes by hydrolyzing a silane such as 5-hexenylmethyldichlorosilane in excess water and then equilibrating the resulting hydrolyzate with cyclopolydimethylsiloxanes and a siloxane oligomer containing alkenyldimethylsiloxane end groups using a base catalyst such as KOH. However, it is believed that the olefinic polydiorganosiloxanes of this invention may also be advantageously prepared in a one-step acid-catalyzed process wherein a silane such as 5-hexenylmethyldichlorosilane is hydrolyzed and simultaneously equilibrated with cyclopolydimethylsiloxanes and 1,3-dialkenyl-1,1,3,3-tetramethyldisiloxane.

For compositions which have a refractive index of less than 1.45 at 25° C., (A) is preferably a polydiorganosiloxane having a combination of methyl and vinyl radicals. Preferred (A) for the low refractive index compositions can be represented by the formula $$CH_2=CH(CH_3)_2SiO\{(CH_3)_2SiO\}_m-\{(CH_2=CH)(CH_3)SiO\}_nSi(CH_3)_2CH=CH_2 \quad (I)$$

where m has an average value of from 80 to 500 and n has an average value of 0 to 10 inclusive. The polymers of (A) where n is a larger number can be used with (B) which have two mercapto groups per molecule.

For compositions which have a refractive index greater than 1.48 at 25° C., (A) is preferably a polydiorganosiloxane having a combination of vinyl, methyl, and phenyl radicals. The preferred (A) for this use have at least 20 percent of the organic radicals being phenyl. The preferred (A) for high refractive index compositions can be represented by the formula $$CH_2=CH(CH_3)_2SiO\{(CH_3)_2SiO\}_p-\{(CH_2=CH)(CH_3)SiO\}_q\{(C_6H_5)_2SiO\}_r-Si(CH_3)_2CH=CH_2 \quad (II)$$

where p has an average value of from 50 to 500, g has an average value of from 0 to 10 inclusive, and the average value of r being such that the mol percent of $(C_6H_5)_2SiO$ units is 20 to 30 inclusive based on the total number of moles of siloxane units in the polydiorganosiloxane. The polymers of (A) where q is a larger number can be used with (B) which have two mercapto groups per molecule.

The mercapto functional crosslinker, (B), can be either a mercapto functional polyorganosiloxane, a mercapto organic compound, or mixtures thereof. The mercapto functional crosslinkers are selected such that the polydiorganosiloxane, (A), and mercapto functional crosslinker, (B), for compatible. The combination of (A) and (B) are compatible when specific polymers or compounds are combined in the amounts to be used, and the resulting mixture does not separate into phases. A cloudy mixture can indicate separate phases and may separate on standing, such combinations are not included within the scope of this invention. A cloudy mixture can be within the scope of this invention if the storage, viscosity stability, and cure properties are met. The selection for compatibility can readily be determined for any specific polymer or compound. Each kind of unit in (A) and its amount will influence the compatability with (B) in which its kind and amount will influence the compatibility.

(B) should have at least two mercapto groups per molecule, preferably the number of mercapto groups in (B) is three or more. The molecules of (B) which contain two mercapto groups are used with (A) in which n or q have large values, such as 10. Preferably, (B) has three or more mercapto groups per molecule because present experimental work suggests that faster UV cures can be obtained with this type of composition.

The mercapto functional polyorganosiloxanes can be represented by the general formula $$R''R_2'SiO(R'''R'SiO)_x(R'RSiO)_ySiR_2'R'' \quad (III)$$

where each R is mercaptoalkyl of 2 to 6 carbon atoms per radical, each R' is methyl, phenyl, 3,3,3-trifluoropropyl, or ethyl; each R'' is —OH, R, or R'; and each R''' is methyl or phenyl. There is on the average at least two mercapto groups per molecule, x is 0 or greater, and y is 0 or greater. Examples of mercapto functional polyorganosiloxanes which contain hydroxyl endgroups are hydroxyl endblocked polymethyl(gamma-mercaptoisobutyl)siloxane hydroxyl enblocked polymethyl(gamma-mercaptopropyl)siloxane where these polymers have from 3 to 20 mercapto containing siloxane units.

For low refractive index, less than 1.45, compositions, preferred (B) can be represented by the average formula $$(CH_3)_3SiO(\{(CH_3)_2SiO\}_w\{R(CH_3)SiO\})_zSi(CH_3)_3 \quad (IV)$$

where R is gamma-mercaptopropyl or mercaptoisobutyl, w has an average value of 3 to 12 and z has an average value of 2 to 8. For the high refractive index, greater than 1.48, compositions, preferred (B) of the siloxane type can be represented by the average formula $$(CH_3)_3SiO(\{(CH_3)_2SiO\}_a\{R(CH_3)SiO\})_bSi(CH_3)_3 \quad (V)$$

where a has an average value of from 0 to 1, b has an average value of from 2 to 20, and R is gamma-mercaptopropyl or mercaptoisobutyl.

The mercapto functional crosslinker, (B), can also be a mecapto organic compound, especially for compositions which have a refractive index greater than 1.48. These mercapto organic compounds are also known in the art by terms such as "polythiols" and "polymercaptans". These mercapto organic compounds contain at least two mercapto groups (—SH) and consist of atoms selected from sulfur, hydrogen, and carbon, and optionally oxygen. Preferably, these mercapto organic compounds contain from 2 to 6 mercapto groups. Some examples are 2,2'-dimercaptodiethylether, dipentaerythritolhexa(3)-mercaptopropionate), glycol dimercaptoacetate, glycol dimercaptopropionate, pentaerythritoltetra(3-mercaptopropionate), pentaerythritol tetrathioglycolate, polyethylene glycol dimercaptoacetate of the formula $$HSCH_2COOCH_2(CH_2OCH_2)_{11}CH_2OOCCH_2SH,$$

polyethylene glycol di(3-mercaptopropionate) of the formula $$HSCH_2CH_2COOCH_2(CH_2OCH_2)_{11}CH_2OOCCH_2CH_2SH,$$

trimethylolethane tri(3-mercaptopropionate), trimethylolethane trithioglycolate, trimethylolpropane tri(3-mercaptopropionate), and trimethylolpropane trithioglycolate.

The photosensitizer, (C), is a compound which will initiate a reaction between alkenyl radicals bonded to silicon atoms and mercaptoalkyl groups when irradiated with ultraviolet light. The photosensitizer is compatible in the composition. Compatability of the photosensitizer can be determined by mixing the ingredients and the photosensitizing compound in an amount of one weight percent based on the weight of the composition and then mixing for up to 16 hours at room temperature, heating at 80° C. for up to four hours, or both. The photosensitizer is said to be compatible if the composition is clear and the photosensitizer has dispersed. Besides compatibility, the photosensitizer should not cause the composition to react undesirably, such as gelling during storage. Some compounds which can be used as photosensitizer in this inventive composition are: benzophenone, acetonaphthone, acetophenone, benzoin methylether, benzoin isobutyether, 2,2-diethoxyacetophenone,

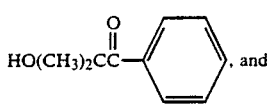, and

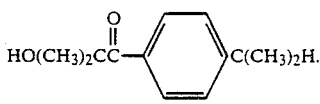

These photosensitiziers represent some compounds which function to an acceptable degree in this invention. The most preferred photosensitizers are 2,2-diethoxyacetophenone and

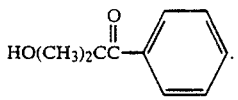

Polysilanes are also useful as photoinitiators in the compositions of this invention. The polysilane photoinitiators which are useful are those which are compatible in the compositions. The polysilanes can be the phenylmethylpolysilanes defined by West in U.S. Pat. No. 4,260,780, issued Apr. 7, 1981 which is hereby incorporated by reference; the aminated methylpolysilanes defined by Baney et al. in U.S. Pat. No. 4,314,956, issued Feb. 9, 1982, which is hereby incorporated by reference; the methylpolysilanes of Peterson et al. in U.S. Pat. No. 4,276,424, issued Jun. 30, 1981 which is hereby incorporated by reference; and the polysilastyrene defined by West et al. in U.S. Pat. No. 4,324,901, issued Apr. 13, 1982 which is hereby incorporated by reference.

The viscosity stabilizer, (D), is a material which is added to the composition to assist in delaying or preventing the gellation of the composition during storage and at temperatures as high as 100° C. This viscosity stabilizer is compatible in the composition and keeps the composition from doubling in 25° C. viscosity when it is heated at 100° C. for 24 hours. Preferably, the composition does not double in 25° C. viscosity when heated at 100° C. for seven days. Amines are observed to serve as viscosity stabilizers. Presently, the most preferred amine for this invention is 2-(diisopropylamino)ethanol. Another amine which is suitable, is trioctylamine. Another type viscosity stabilizer is a free radical scavenger, such as p-methoxyphenol (also known as monomethylester of hydroquinone, MEHQ), catechol, 4-t-butylcatechol, phenothiazine, hydroquinone, 2,6-di-t-butyl-p-methylphenol, and N-phenyl-2-naphthylamine. The free radical scavenger viscosity stabilizers are used in amounts of preferably of zero to one weight percent based on the weight of the composition, more preferably from 0.01 to 0.1 weight percent. The most preferred free radical scavenger viscosity stabilizer is MEHQ.

The compositions of this invention can contain reinforcing agent, (E). The compositions preferably contain a reinforcing agent when a stronger or tougher cured product is desired or needed in the use. Preferably, a reinforcing agent is present in the composition for optical fiber coating applications. If the composition of this invention is used for other than optical fiber coating, such as for coating electrical equipment and devices, it can contain many kinds of fillers as reinforcing agents such as fumed silica which can be untreated or treated to make it hydrophobic such as with organosilanes, organosiloxanes, or organosilazanes. For optical fiber coating applications, the reinforcing agent should be a material which does not substantially increase the opacity of the composition compared to the composition without the reinforcing agent. For optical fiber coating materials, the reinforcing agent is preferably present in an amount of at least five weight percent. The reinforcing agent for optical fiber coating should also be nonabrasive to a glass surface, especially a glass surface of fiber to be used as an optical fiber. The optical glass fiber can contain certain claddings on its surface. The reinforcing agent is preferably a benzene soluble silicone resin when the composition is used as a coating for optical fibers. One preferred benzene soluble silicone resin, as (E), contains trimethylsiloxy units, dimethylvinylsiloxy units, and $SiO_2$ units. The ratio of moles of

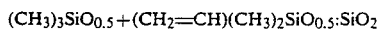

is from 0.5:1 to 1.1:1 and contains 1.7 to 2.0 weight percent vinyl radical based on the weight of the resin. Other examples of siloxane resins which can be used for reinforcing the composition of this invention when used as a coating for optical communications fibers are a resin having 5 mol percent dimethylvinylsiloxy units, 35 mol percent trimethylsiloxy units, and 60 mol percent $SiO_2$ units; a resin having 10 percent dimethylvinylsiloxy units, 20 mol percent trimethylsiloxy units, and 70 mol percent monophenylsilsesquioxane units; and resins having 6.3 to 15 mol percent dimethylvinylsiloxy units, 6.8 to 23.7 mol percent trimethylsiloxy units, 0 to 45 mol percent monomethylsilsesquioxane units, and 35 to 85 mol percent monophenylsilsesquioxane units; resins which are copolymers of monopropylsilsesquioxane units and monophenylsilsesquioxane units endblocked with dimethylvinylsiloxy units; and a resin of trimethylsiloxy units and $SiO_2$ units endblocked with diphenylvinylsiloxy units. For the high refractive index composition based on polydiorganosiloxane having phenyl radical, the preferred siloxane resins are the phenyl-containing siloxane resins because these provide compatible compositions.

In addition to resins, the present compositions can be reinforced by using mixtures of polydiorganosiloxanes for (A) in which at least one polydiorganosiloxane has a low alkenyl radical content, such as is an alkenyl endblocked polydiorganosiloxane and at least one polydiorganosiloxane has a high alkenyl content such as 15 to 30 mole percent siloxane units containing alkenyl radicals. The amount of the high alkenyl content polydiorganosiloxane can be up to 25 percent of the weight of (A). The highest tensile strengths are obtained in the range of from 5 to 20 percent of high alkenyl content polydiorganosiloxane. For example, a mixture of polydiorganosiloxanes can be a dimethylvinylsiloxy endblocked polydimethylsiloxane having a degree of polymerization of 50 to 300 mixed with a dimethylvinylsiloxy endblocked polydiorganosiloxane having 78 mole percent dimethylsiloxane units and 22 mole percent methylvinylsiloxane units and having a degree of polymerization of from 50 to 300 wherein the 22 mole percent methylvinylsiloxane containing polymer is present in amounts of from 5 to 20 weight percent.

Methods of mixing the ingredients (A) through (E) can be varied as long as the resulting composition cures when exposed to the UV energy as defined. The mixing method should also not alter the one package stability and the viscosity stability. Preferably, (A) and (B) are mixed, and then (C) and (D) are added and mixed using conventional mixing equipment. When (E) is present, the preferred mixing procedure is to mix (A) and (E)

and thereafter add the remaining ingredients. When (E) is the benzene soluble silicone resin as defined above, the mixture of (A) and (E) may require heating or heating at reduced pressure to remove solvent in which the benzene soluble silicone resin is kept. A mixture of (A) and the benzene soluble silicone resin in xylene can be heated to about 100° C. at about 667 Pa to remove the xylene and form a homogeneous mixture of (A) and the resin. Sometimes a mixture of (A), (B), and (C) and optionally (E), prepared at room temperature, are slightly cloudy, but become clear indicating compatibility when (D) is added. Sometimes, if a mixture of (A), (B), and (C) and optionally (E), prepared at room temperature, do not become clear upon the addition of (D), heating the composition may product clarity (compatibility) which will remain after the composition has cooled to room temperature.

Although compatibility and clarity are preferred, such features should not limit the use of the compositions of this invention in optical fiber coating applications, such as primary coatings and secondary coatings because some types of optical fiber coatings do not need to be clear to function properly. An important limitation of the compositions of this invention is the ability to cure rapidly as indicated by the UV radiation energy requirement. The UV cure at 70 millijoules or less per square centimeter coating surface should cure the composition in one second or less, preferably in less than 0.3 seconds. If the composition is slightly cloudy and cures in these times with the stated UV radiation, then it is covered by the present invention. The composition can be prepared and stored in most equipment but some metals may cause premature reaction or cures, such as certain ferrous metals. Also, light should be avoided both during processing and especially during storage.

The compositions of this invention are mixtures of ingredients (A) through (E) which have a ratio of alkenyl radicals per mercapto group of 0.5 to 1.5, thus the amounts of (A) and (B) are defined once the specific polymers are stated. The amounts of (A) and (B) can vary if (E) is a vinyl containing benzene soluble silicone resin. Also, the compositions preferably have a viscosity at 25° C. in the range of 1 to 20 Pa's, most preferred is 1 to 8 Pa's.

Other ingredients which might be considered as useful in the present composition are those which do not deleteriously alter the one package stability, the viscosity stability, and the curing conditions. Such ingredients may be dyes, pigments, or other fillers. Some ingredients, such as certain fillers would not find utility as a prime coat for optical fibers because such fillers would be abrasive, however, other less sensitive applications may find such materials completely adequate. Another ingredient which might be added is a processing aid which helps improve the compatibility, viscosity or coating properties but otherwise does not substantially change the composition properties.

Preferred embodiments within the scope of the present invention are compositions which have a low refractive index, as measured by the sodium D line at 25° C., $n_D^{25}$ of less than 1.45, preferably about 1.42 and compositions which have a high refractive index, as measured by the sodium D line at 25° C., of greater than 1.48, preferably from 1.48 to 1.55.

The low refractive index compositions are preferably obtained by mixing (A) a polydiorganosiloxane represented by formula (I), (B) a mercapto functional polyorganosiloxane of formula (IV), and (C) 2,2'-diethoxyacetophenone or

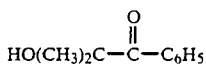

in an amount of 1 to 4 weight percent based on the total weight of the composition, and the ratio of vinyl radical per mercapto group is 0.57:1 to 1:1.25. These preferred compositions can also contain an amine which does not increase the opacity of the composition compared to the composition without the amine, preferably the amine is trioctylamine or 2-(diisopropylamino)ethanol which is present in an amount of from 0.5 to 1.5 weight percent based on the total weight of the composition. The most preferred low refractive index compositions are those which contain the benzene soluble silicone resin as defined above in amounts of 23 to 37.5 percent by weight based on the total weight of the composition because they are tougher and stronger. Those compositions which are described as preferred low refractive index compositions preferably do not contain any other ingredients which alter the refractive index such as increasing it to greater than 1.45. Most preferred low refractive index compositions have a refractive index of about 1.42.

The high refractive index composition, as preferred embodiments. can be of two types as identified by the type of crosslinker used, one using mercapto functional polyorgano-siloxane and a second using a mercapto organic compound.

The preferred high refractive index compositions using the mercapto functional polyorganosiloxane crosslinker are those which are obtained by mixing (A) a polydiorganosiloxane represented by formula (II), (B) a mercapto functional polyorganosiloxane of formula (V), and (C) 2,2-diethoxyacetophenone or

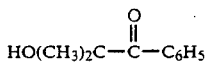

in an amount of 1 to 4 weight percent based on the total weight of the composition and the ratio of the vinyl radicals to mercapto groups is 0.57:1 to 1:1.25. These preferred compositions can also contain an amine which does not increase the opacity of the composition compared to the composition without the amine. Instead of an amine stabilizer these preferred compositions can contain paramethoxyphenol as a stabilizer. The preferred high refractive index composition are those which have a refractive index as measured by the sodium D line at 25° C. of greater than 1.48 especially those of 1.48 to 1.55.

The other type of preferred high refractive index compositions are those which are obtained by mixing (A) a dimethylvinylsiloxy endblocked polydiorganosiloxane containing siloxane units selected from dimethylsiloxane units, methylphenylsiloxane units, and diphenylsiloxane units where at least 30 percent of the organic radicals are phenyl. (B) a mercapto organic compound selected from at least one of

C(CH₂OOCCH₂SH₄,

CH₃C(CH₂CCH₂CH₂SH)₃,

CH₃CH₂C(CH₂OOCCH₂CH₂SH)₃, and

CH₃CH₂C(CH₂OOCCH₂SH)₃ and (C) 2,2-diethoxyacetophenone or

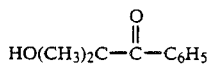

in an amount of 1 to 4 weight percent based on the weight of the total composition. Also the stabilizers can be present as stated above.

The compositions of this invention have numerous advantages over many other compositions used for coating optical fiber as stated herein such as it is one package storable, and has a viscosity which does not double when heated at 100° C. for 24 hours. One advantage is the optical fiber can be made with low attenuation using this composition. These compositions cure at room temperature by exposure to UV radiation. The UV cure is so rapid that very high speed coating lines can be used, such as 300 feet per minute. Cure times of 0.1 second are obtainable. The compositions of this invention are not severely inhibited by oxygen.

The compositions of this invention cure to elastomers which have a relatively low modulus, are tough, remain elastomeric over a broad temperature range, such as from 80° C. to minus 60° C. for the low refractive index compositions. The compositions of this invention cure by an addition type reaction and do not give off by products.

Other utility of the compositions of this invention are wood finishing, textile coating, paper and plastic varnishes, adhesives, printing inks, metal decorating coatings, wire coatings, electronic encapsulants, and resist coatings.

The following examples are presented for illustrative purposes and are not intended to limit the claims which are properly delineated in the claims. All parts are parts by weight and viscosities are measured at 25° C. unless otherwise stated.

EXAMPLE 1

A composition which cures to an elastomer by UV radiation was made by mixing 79.4 parts of a mixture of 32 weight percent xylene and 68 weight percent of benzene soluble silicone resin (Resin I) containing dimethylvinylsiloxy units, trimethysiloxy units, and SiO₂ units where the ratio of the sum of the mols of dimethylvinylsiloxy units and trimethylsiloxy units to SiO₂ units was 0.65:1 and there was 1.9 weight percent vinyl radical in the resin with 100 parts of dimethylvinylsiloxy endblocked polydimethylsiloxane having a viscosity of about 2 Pa's (Polymer I). The resulting mixture was stripped of xylene by heating to 100° C. at a pressure of about 670 Pa resulting in a clear polymer-resin blend (Blend I). A mercapto functional polyorganosiloxane of the average formula

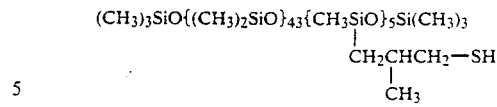

(Crosslinker I) in an amount of 17.81 parts was mixed into 80.23 parts of Blend I and then 0.98 part of photosensitizer,

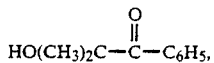

and 0.98 part of 2-(diisopropylamino)ethanol was mixed to make a composition of this invention. The resulting composition was clear, had a viscosity of 2.08 Pa's. and was stored in a container opaque to light including UV radiation. This composition remains unchanged in viscosity and cured properties after storage for over nine months.

The composition was coated on a monel wire of 125 microns to a thickness of between 25 and 115 micrometers and then exposed to UV radiation generated by four medium pressure mercury vapor lamps equidistant from the wire and each other, and also parallel to the wire. The composition was defined as cured when the surface was tack free and the physical properties were near maximum. The coated wire cured in less than 0.1 second. The coated wire speed was 200 meters per minute through the UV lamp configuration. A sample of the composition was evenly spread on an aluminum test panel in a thickness of about 200 micrometers, and then exposed to UV radiation of 24 millijoules or less per square centimeter using as a UV source a medium pressure mercury vapor lamp. The sample cured in 0.5 second. The cured sample was removed from the aluminum test panel and cut into test pieces of 6.35 mm wide and about 3 cm long with a thickness of 125 to 150 micrometers. These test pieces were placed in an Instron tensile tester using a crosshead separation of 2 cm and then the elongation at break, the tensile strength at break, and modulus were measured. Six test pieces gave the average values of 3.17 MPa tensile strength at break, 160% elongation at break, and a 50% modulus of 0.34 MPa.

The cured composition had a refractive index. $n_D^{25}$, of 1.416 and a Tg of −126° C. The cured elastomer had a 2.5% modulus as follows

| Temperature, °C. | 2.5% Modulus, MPa |
|---|---|
| 80 | 0.017 |
| 20 | 0.022 |
| −20 | 0.026 |
| −60 | 0.059 |

Another composition was prepared as described above, the initial properties were very similar to the initial properties of the first prepared composition as indicated in Table I. The composition was heated at 100° C. for the times indicated and then the viscosity at 25° C. was measured, a sample was then cured and the tensile strength at break and the elongation at break were measured as described above. The UV cure time after each aging time was 0.3 second or less at 24 millijoule per square centimeter.

TABLE I

| Aging Time, Hours | Viscosity, Pa·s | Tensile, MPa | Elongation, % |
| --- | --- | --- | --- |
| 0 | 1.92 | 3.14 | 150 |
| 4 | 2.24 | 4.00 | 165 |
| 16 | 2.32 | 4.96 | 175 |
| 72 | 2.64 | 2.59 | 150 |
| 168 | 2.92 | 2.78 | 150 |

This example illustrates a low refractive index composition suitable for use as the prime coating on an optical fiber made by melt drawing a glass fiber, and while still hot, such as about 200° C., into the composition and then exposing the coated fiber to UV radiation. This example also illustrates the one package storage capability, the viscosity stability at 100° C. and the rapid UV cure times.

The composition was stored in a container opaque to UV radiation for 4 hours and for two months and was then cured by exposure to UV radiation as stated above for making test pieces. The cure times were 0.5 second and 0.6 second respectively. The cured physical properties were obtained as described above and are reported in Table II.

TABLE II

| Storage Time | Tensile, MPa | Elongation, % | 50% Modulus, MPa |
| --- | --- | --- | --- |
| 4 hours | 3.69 | 185 | 0.30 |
| 2 months | 3.59 | 185 | 0.31 |

This data illustrates the storage stability in a one package container. A composition was prepared as described above except the 2-(diisopropylamino)ethanol was left out. This composition gelled in a few days indicating that the viscosity stabilizer is necessary in this type of composition for long storage periods.

EXAMPLE 2

A composition which cures to a high refractive index silicone elastomer was prepared by mixing 89.03 parts of a polydiorganosiloxane of the average formula $$CH_2=CH(CH_3)_2SiO\{(CH_3)_2SiO\}_{77}\text{---}\{(C_6H_5)_2Si\text{-}O\}_{21}Si(CH_3)_2CH=CH_2,$$

7.12 parts of a mercapto functional polyorganosiloxane (Crosslinker II) of the average formula $$HSCH_2CH(CH_3)CH_2(CH_3)_2SiO\{CH_3)_2SiO\}_{12}\text{---}\{CH_3SiO\}_3Si(CH_3)_2CH_2CH(CH_3)CH_2SH,$$
$$|$$
$$CH_2CH(CH_3)CH_2SH$$

and 3.85 part of $$HO(CH_3)_2C\text{---}\overset{O}{\underset{\|}{C}}\text{---}C_6H_5.$$

The resulting mixture was transparent and was packaged in a container opaque to UV radiation. This mixture had a viscosity of 1.7 Pa's. and refractive index, $n_D^{25}$ of 1.488. Exposure to UV radiation from a medium pressure mercury vapor lamp in air which provided 24 millijoules per square centimeter of composition surface of about 200 micrometers thickness cured the composition in less than 0.3 second. The cured elastomer had a tensile strength at break of 0.31 MPa. an elongation at break of 215%, and a 2.5% modulus of 0.007 MPa at 25° C. This composition is useful as a prime coat for optical fibers where a refractive index of greater than 1.48 is preferred or required. This composition illustrates the capability of fast cure by UV radiation.

EXAMPLE 3

A composition which can be cured by UV radiation to an elastomer was prepared by mixing 94.22 parts of a dimethylvinylsiloxy endblocked polymethylphenylsiloxane having an average of 48 methylphenylsiloxane units per molecule, 3.82 parts of $$CH_3CH_2C(CH_2OOCCH_2CH_2SH)_3$$

and 1.96 parts of $$HO(CH_3)_2C\text{---}\overset{O}{\underset{\|}{C}}\text{---}C_6H_5.$$

The resulting mixture was transparent, had a viscosity of 11.3 Pa's, and a refractive index, $n_D^{25}$ of 1.550. A composition in a thickness of about 200 micrometers cured in less than 0.3 second to an elastomer having a tensile strength at break of 0.34 MPa, an elongation at break of 120%, and a 2.5% modulus of 0.007 MPa at 25° C. and a 2.5% modulus of 0.79 MPa at −60° C. This composition illustrates the use of mercapto organic compound as the crosslinker for a siloxane polymer composition, a fast UV curing high refractive index composition, and a composition useful as the primary coating for optical fibers.

EXAMPLE 4

Several compositions were prepared by mixing a polydiorganosiloxane and Resin I as described in Example 1 and then removing the xylene to make a blend of polymer and resin. The following ingredients were used to make compositions as defined by Table III.

Blend II—47.2 parts of Resin I solids and 52.8 parts of a dimethylvinylsiloxy endblocked polydimethylsiloxane having a viscosity of about 0.4 Pa's (Polymer II)

Blend III—50 parts of Resin I solids and 50 parts of Polymer I

Crosslinker III—trimethylsiloxy endblocked polyorganosiloxane having an average of 30 dimethylsiloxane units and 5 units of methyl(mercaptoisobutyl)siloxane Crosslinker IV—trimethylsiloxy endblocked polyorganosiloxane having an average of 90 dimethylsiloxane units and 8 units of methyl(mercaptoisobutyl)siloxane Crosslinker V—trimethylsiloxy endblocked polyorganosiloxane having an average of 18 dimethylsiloxane units and 3 units of methyl(mercaptoisobutyl)siloxane Crosslinker VI—trimethylsiloxy endblocked polyorganosiloxane having an average of 24 dimethylsiloxane units and 4 units of methyl(mercaptoisobutyl)siloxane Crosslinker VII—trimethylsiloxy endblocked polyorganosiloxane having an average of 61 dimethylsiloxane units and 7 units of methyl(mercaptoisobutyl)siloxane Crosslinker VIII—trimethylsiloxy endblocked polyorganosiloxane having an average of 41 dimethylsiloxane units and 7 units of methyl(mercaptoisobutyl)-siloxane Crosslinker IX—trimethylsiloxy endblocked polyorganosiloxane having an average of 45 dimethylsiloxane units and 3 units of methyl(mercaptoisobutyl)-siloxane Crosslinker X—trimethylsiloxy endblocked polyorganosiloxane having an average of 93 dimethylsiloxane units and 5 units of methyl(mercaptoisobutyl)-siloxane Crosslinker XI—trimethylsiloxy endblocked polyorganosiloxane having an average of 86 dimethylsiloxane units and 12 units of methyl(mercaptoisobutyl)-siloxane Crosslinker XII—trimethylsiloxy endblocked polyorganosiloxane having an average of 20 dimethylsiloxane units and 5 units of methyl(mercaptoisobutyl)-siloxane The compositions shown in Table III were prepared to have a ratio of vinyl radical to mercapto group of 1.25:1 and each contained 0.29 part of 2,2'-diethoxyacetophenone and 0.29 part of trioctylamine. The compositions were made by blending the ingredients and the properties were measured as described in Example 1. The results for each of the compositions are shown in Table IV. These compositions illustrate the variety of mercapto functional polyorganosiloxane crosslinkers which have fast cure and can be used for a primary coat on optical fibers. The cure time shown in Table IV was for UV radiation of a film thickness of about 200 micrometers.

TABLE III

| Composition | Blend No. | Parts | Polymer No. | Parts | Crosslinker No. | Parts | Viscosity Pa · s |
|---|---|---|---|---|---|---|---|
| A | II | 19.08 | II | 5.35 | III | 4.57 | 0.96 |
| B | II | 19.08 | II | 4.74 | VIII | 4.74 | 1.12 |
| C | II | 19.08 | II | 2.50 | IV | 7.42 | 1.16 |
| D | II | 19.08 | II | 5.05 | V | 4.87 | 0.92 |
| E | II | 19.08 | II | 5.03 | VI | 4.89 | 0.92 |
| F | II | 19.08 | II | 3.37 | VII | 6.55 | 1.08 |
| G | III | 18 | I | 6.76 | V | 4.24 | 2.20 |
| H | III | 18 | I | 6.74 | VI | 4.26 | 2.20 |
| I | III | 18 | I | 5.21 | VII | 5.79 | 2.32 |
| J | III | 18 | I | 7.02 | III | 3.972 | 2.32 |
| K | III | 18 | I | 2.52 | IX | 8.482 | 1.64 |
| L | III | 18 | I | 6.871 | VIII | 4.129 | 2.72 |
| M | III | 18 | I | 1.233 | X | 9.669 | 1.96 |
| N | III | 18 | I | 6.305 | XI | 4.695 | 2.80 |
| O | III | 18 | I | 4.393 | IV | 6.607 | 2.32 |
| P | III | 18 | I | 7.647 | XII | 3.353 | 2.64 |
| Q | III | 18 | I | 8.494 | II | 2.506 | 2.76 |

TABLE IV

| Composition | Compatibility | Cure Time, sec. | Tensile Strength MPa | Elongation % | 50% Modulus MPa |
|---|---|---|---|---|---|
| A | Clear | 0.4 | 1.44 | 124 | 0.37 |
| B | Cloudy | 0.4 | 1.20 | 92 | 0.46 |
| C | Clear | 0.4 | 0.90 | 90 | 0.41 |
| D | Clear | 0.4 | 1.14 | 115 | 0.32 |
| E | Clear | 0.4 | 1.26 | 111 | 0.34 |
| F | Clear | 0.4 | 0.88 | 78 | 0.46 |
| G | Clear | 0.4 | 1.26 | 128 | 0.27 |
| H | Clear | 0.4 | 2.76 | 166 | 0.30 |
| I | Clear | 0.4 | 1.41 | 111 | 0.40 |
| J | Clear | 0.32 | 3.53 | 188 | 0.34 |
| K | Clear | 0.63 | 1.12 | 128 | 0.27 |
| L | Cloudy | 0.32 | 1.17 | 93 | 0.37 |
| M | Clear | 0.32 | 0.90 | 119 | 0.29 |
| N | Cloudy | 0.32 | 2.03 | 138 | 0.38 |
| O | Clear | 0.32 | 1.88 | 150 | 0.34 |
| P | Cloudy | 0.32 | 2.20 | 172 | 0.38 |
| R | Cloudy | 0.32 | 2.00 | 202 | 0.22 |

EXAMPLE 5

A base was prepared by mixing 100 parts of a blend of 78.9 parts of dimethylvinylsiloxy endblocked polydimethylsiloxane having a viscosity of about 40 Pa's and 21.1 parts of Resin I solids with 60 parts of five micron crushed quartz. A composition was prepared by mixing 16 parts of the base, 1.27 parts of Crosslinker I, 0.17 part of

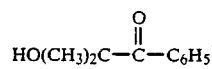

and 0.17 part of 2-(diisopropylamino)ethanol. This composition had a ratio of vinyl radical to mercapto group of 0.8:1. This composition in a film thickness of about 200 micrometers cured by UV radiation with one pass under two medium pressure mercury vapor lamps at a rate of 10 m per minute. The resulting cured elastomer had a tensile strength at break of 3.22 MPa, an elongation at break of 189%, and a 50% modulus of 0.66 MPa. This composition illustrates the fast cure nature in the presence of an extending filler.

EXAMPLE 6

Compositions which cure to an elastomer by UV radiation and which use polydiorganosiloxanes containing higher alkenyl radicals were made by mixing the following ingredients:

Composition I (a) 100 parts of a polydiorganosiloxane of the average formula

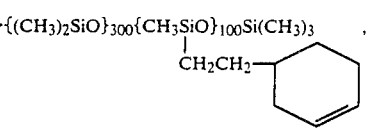

(b) 163 parts of a mercapto functional crosslinker of the average formula

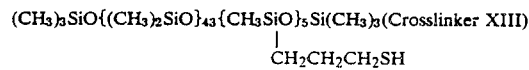

and (c) 8 parts of a photosensitizer of the following formula

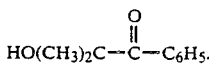

Composition II (a) 100 parts of a polydiorganosiloxane of the average formula

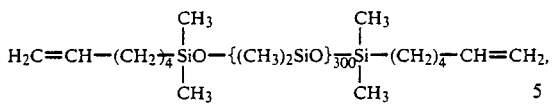

(b) 8 parts of Crosslinker XIII, and
(c) 3 parts of the photosensitizer described in (c) of Composition I.

V. The compositions were exposed to UV radiation for 0.3 seconds (24 millijoules per square centimeter) and 0.7 seconds (50 millijoules per square centimeter). The results of the exposure are described in Table V in which "ST" means slightly tacky, "VT" means very tacky, and "T" means tacky. The appearance of the uncured composition as observed is also described in Table V.

TABLE V

| RATIO OF VINYL/SH | PHOTO-INITIATOR | AMINE TYPE (AMOUNT) | APPEARANCE UNCURED | UV EXPOSURE 0.3 SEC | UV EXPOSURE 0.7 SEC |
|---|---|---|---|---|---|
| 0.67/1.00 | 1 | DIPAE(0.25%) | Clear | ST | ST |
| 0.80/1.00 | 1 | DIPAE(0.25%) | Clear | ST | ST |
| 1.00/1.00 | 1 | DIPAE(0.25%) | Clear | VT | ST |
| 1.25/1.00 | 1 | DIPAE(0.25%) | Clear | VT | ST |
| 0.80/1.00 | 1 | None | Clear | ST | ST |
| 0.80/1.00 | 1 | DIPAE(0.25%) | Clear | ST | ST |
| 0.80/1.00 | 1 | DIPAE(1.00%) | Clear | T | T |
| 0.80/1.00 | 1 | TOA(0.25%) | Hazy | T | T |
| 0.80/1.00 | 1 | TOA(1.00%) | Clear | T | T |
| 0.80/1.00 | 1 | None | Clear | ST | ST |
| 0.80/1.00 | 2 | None | Clear | T | T |

Photoinitiator 1 was the compound described in Example 6, Composition I.
Photoinitiator 2 was 2,2-diethoxyacetophenone.
DIPAE was 2-(diisopropylamino)ethanol.
TOA was trioctylamine.

Composition III (a) 250 parts of a polydiorganosiloxane of the average formula

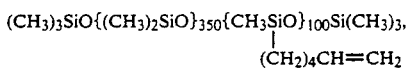

(b) 408 parts of Crosslinker XIII, and
(c) 20 parts of the photosensitizer described in (c) of Composition I.

Compositions I and III were clear and Composition II was cloudy. Each of the above compositions were cured by exposing them to UV radiation to give them 50 millijoules per square centimeter. Composition I cured to a tack free elastomer having an elongation of about 25 percent. Composition II cured to a snappy elastomer with a very light tack on the surface. Composition III cured to a tack free material with a low elongation.

EXAMPLE 7

Compositions which cured to elastomer when exposed to UV radiation and which contained polydiorganosiloxanes having a high refractive index were made by blending a polydiorganosiloxane which was endblocked with dimethylvinylsiloxy units and contained about 66 mole percent dimethylsiloxane units and 34 mole percent diphenylsiloxane units and had a degree of polymerization of about 100 and a mercapto functional crosslinker of the formula

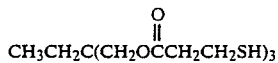

in amounts such that the ratio of the vinyl radical to mercapto group as shown in Table V. The photoinitiator (photosensitizer) in an amount of 2 weight percent and the amine stabilizer and its amounts which were added to the blend of the polydiorganosiloxane and mercapto functional crosslinker are described in Table

EXAMPLE 8

Compositions were prepared in which several different polydiorganosiloxanes and mercaptofunctional crosslinkers were used. These compositions produced high refractive index coatings with values >1.48. The compositions were made by blending the ingredients and were as follows:

Composition IV (a) 96.1 parts of a dimethylvinylsiloxy endblocked polydiorganosiloxane having 30 mole percent diphenylsiloxane units and 70 mole percent dimethylsiloxane units and having a degree of polymerization of 100.

(b) 2.0 parts of a mercaptofunctional crosslinker of the average formula

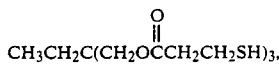

and
(c) 1.9 parts of a photoinitiator of the formula

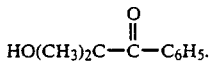

Composition V (a) 96.1 parts of a dimethylvinylsiloxy endblocked polydiorganosiloxane having 21 mole percent diphenylsiloxane units and 79 mole percent dimethylsiloxane units and having a degree of polymerization of 100.

(b) 2 parts of a mercaptofunctional crosslinker of the average formula

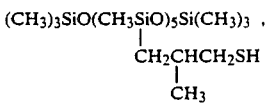

and (c) 2 parts of the photoinitiator described in (c) of Composition IV.

Composition VI 96.1 parts of the dimethylvinylsiloxy endblocked polydiorganosiloxane described in (a) of Composition V, (b) 2.0 parts of the mercaptofunctional crosslinker as described in (b) of Composition V, and (c) 4 parts of the photoinitiator as described in (c) of Composition IV.

Composition VII (a) 96.1 parts of a dimethylvinylsiloxy endblocked polydiorganosiloxane having 21 mole percent diphenylsiloxane units and 79 mole percent dimethylsiloxane units and having a degree of polymerization of 200.

(b) 2 parts by weight of the mercaptofunctional crosslinker as described in (b) of Composition VI.

(c) 2 parts of the photoinitiator as described in (c) of Composition IV, and (d) 50 ppm of paramethoxyphenol as a storage stabilizer.

Composition VIII (a) 96.1 parts of the dimethylvinylsiloxy endblocked polydiorganosiloxane as described in (a) of Composition VII, (b) 2 parts of a mercaptofunctional crosslinker of the average formula

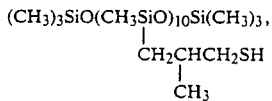

and (c) 2 parts of the photoinitiator as described in (c) of Composition IV.

Composition IX (a) 96.1 parts of the dimethylvinylsiloxy endblocked polydiorganosiloxane as described in (a) of Composition VII, (b) 2 parts of the mercaptofunctional crosslinker as described in (b) of Composition VIII, (c) 2 parts of the photoinitiator as described in (c) of Composition VI, and (d) 50 ppm of paramethoxyphenol as a storage stabilizer.

Composition X (a) 96.1 parts of a dimethylvinylsiloxy endblocked polydiorganosiloxane having 21 mole percent diphenylsiloxane units and 79 mole percent dimethylsiloxane units and having a degree of polymerization of 300, (b) 2 parts of the mercaptofunctional crosslinker as described in (b) of Composition V, and (c) 2 parts of the photoinitiator as described in (c) of Composition IV.

The above compositions were clear and were exposed to UV radiation with the amount of energy received shown in Table VI. The 50% modulus, the tensile strength at break and the elongation at break were measured with the results shown in Table VI.

TABLE VI

| COMPOSITION | UV EXPOSURE mJ/cm$^2$ | 50% MODULUS kPa | TENSILE kPa | ELONGATION % |
|---|---|---|---|---|
| IV | 224 | 96.5 | 206.8 | 150 |
| V | 224 | 213.7 | 275.8 | 80 |
| VI | 224 | 193.1 | 344.7 | 110 |
| VII | 224 | 137.9 | 310.3 | 180 |
| VIII | 224 | 158.6 | 310.3 | 145 |
| IX | 224 | 158.6 | 344.7 | 165 |
| IX | 24 | 131.0 | 379.2 | 220 |
| X | 224 | — | 172.4 | 150 |

The Composition IX cured with 24 mJ/cm$^2$ of UV radiation cured in 0.3 seconds. This example showed that the compositions of this invention cured in a very short time with low amounts of UV energy. The other compositions would also cure in a short time, such as less than one second. Composition IX had a shelf life of greater than three months, a viscosity at 25° C. of 2.2 Pa's. and a refractive index of 1.488.

EXAMPLE 9

The use of mixtures of alkenyl containing polydiorganosiloxanes to provide reinforcement to the cured elastomers is illustrated by this example.

Compositions were prepared by blending the ingredients as described below to make homogeneous compatible materials:

Composition XI (a) 137.5 parts of a dimethylvinylsiloxy endblocked polydimethylsiloxane having a degree of polymerization of about 300, (b) 12.5 parts of a dimethylvinylsiloxy endblocked polydisiloxane having 22.2 mole percent methylvinylsiloxane units and 77.8 mole percent dimethylsiloxane units and having a degree of polymerization of about 450, (c) 37.4 parts of Crosslinker I as described in Example 1, and (d) 3.7 parts of the photoinitiator as described in (c) of Composition IV.

Composition XII (a) 137.5 parts of a dimethylvinylsiloxy endblocked polydimethylsiloxane having a degree of polymerization of about 300, (b) 12.5 parts of a dimethylvinylsiloxy endblocked polydisiloxane having 22.2 mole percent methylvinylsiloxane units and 77.8 mole percent dimethylsiloxane units and having a degree of polymerization of about 450, (c) 37.4 parts of Crosslinker I as described in Example 1, (d) 3.7 parts of the photoinitiator as described in (c) of Composition IV, and (e) 3.7 parts of diisopropylaminoethanol as a storage stabilizer.

Composition XIII (a) 100 parts of a dimethylvinylsiloxy endblocked polydiorganosiloxane having 25 mole percent diphenylsiloxane units and 75 mole percent dimethylsiloxane units and having a degree of polymerization of about 200, (b) 10 parts of a dimethylvinylsiloxy endblocked polydiorganosiloxane having 25 mole percent diphenylsiloxane units, 21 mole percent methylvinylsiloxane units, and 54 mole percent dimethylsiloxane units, and having a degree of polymerization of about 300, (c) an amount of the Crosslinker as described in Composition VIII of Example 8 to provide a ratio of vinyl radical to mercapto group of 1.00/1.00, and (d) 2 weight percent of the photoinitiator as described in (c) of Composition IV.

Composition XIV (a) 100 parts of a dimethylvinylsiloxy endblocked polydiorganosiloxane having 25 mole percent diphenylsiloxane units and 75 mole percent dimethylsiloxane units and having a degree of polymerization of about 200, (b) 15 parts of a dimethylvinylsiloxy endblocked polydiorganosiloxane having 25 mole percent diphenylsiloxane units, 21 mole percent methylvinylsiloxane units, and 54 mole percent dimethylsiloxane units, and having a degree of polymerization of about 300, (c) an amount of the Crosslinker as described in Composition VIII of Example 8 to provide a ratio of vinyl radical to mercapto group of 1.00/1.00, and (d) 2 weight percent of the photoinitiator as described in (c) of Composition IV.

These compositions were cured by exposure to UV radiation in the amount of energy as described in Table VII. The tensile strength at break, the elongation at break, and the 50% modulus were measured on the cured elastomer and the results observed were as shown in Table VII.

TABLE VII

| COMPO-SITION | UV ENERGY mJ/cm$^2$ | TENSILE kPa | ELONGATION % | MODULUS kPa |
|---|---|---|---|---|
| XI | 24 | 2137 | 240 | 193.1 |
| XI | 50 | 2068 | 290 | 158.6 |
| XII | 24 | 1034 | 170 | 151.7 |
| XII | 50 | 2551 | 245 | 186.2 |
| XIII | 10 | 1000 | 150 | 206.8 |
| XIII | 24 | 1172 | 160 | 262.0 |
| XIII | 50 | 1517 | 155 | 262.0 |
| XIII | 224 | 2344 | 175 | 268.9 |
| XIV | 15 | 1207 | 105 | 379.2 |
| XIV | 30 | 2068 | 120 | 393.0 |
| XIV | 60 | 1931 | 120 | 372.3 |
| XIV | 224 | 2034 | 120 | 400.0 |

EXAMPLE 10

This example shows reinforcing the compositions of this invention by using resins. The compositions were prepared by blending the following ingredients to make the compositions which cure by exposure to UV radiation.

Composition XV (a) 100 parts of the dimethylvinylsiloxy endblocked polydiorganosiloxane as described in (a) of Composition XIV, (b) 30 parts of a siloxane resin having 70 mole percent monophenylsilsesquioxane units, 10 mole percent dimethylvinylsiloxy units, and 20 mole percent trimethylsiloxy units, (c) an amount of the Crosslinker as described in (c) of Composition VIII of Example 8 to provide a ratio of vinyl radical to mercapto group of 0.80/1.00, and (d) 2 weight percent of the photoinitiator as described in (c) of Composition IV.

Composition XVI (a) 92.6 parts of dimethylvinylsiloxy endblocked polymethylphenylsiloxane having a degree of polymerization of about 50, (b) 45 parts of a siloxane resin having 70 mole percent monophenylsilsesquioxane units and 30 mole percent monopropylsilsesquioxane units and being endcapped with dimethylvinylsiloxy units and having a theoretical equivalent weight of about 1500 based on vinyl radical, (c) 7.4 parts of trimethylolpropanetrimercaptoproprionate. and (d) 2.9 parts of the photoinitiator as described in (c) of Composition IV.

Composition XVII (a) 93.9 parts of the dimethylvinylsiloxy endblocked polymethylphenylsiloxane having a degree of polymerization of about 50, (b) 45 parts of a siloxane resin as described in (b) of Composition XVI except the theoretical equivalent weight is about 3000 based on vinyl radical.

(c) 6.1 parts of trimethylolpropanetrimercaptoprop-rionate, and (d) 2.9 parts of the photoinitiator as described in (c) of Composition IV.

Composition XVIII (a) 91.8 parts of the dimethylvinylsiloxy endblocked polymethylphenylsiloxane having a degree of polymerization of about 50, (b) 45 parts of a siloxane resin having 75 mole percent monophenylsilsesquioxane units, 7.9 mole dimethylvinylsiloxy units, and 17.1 mole percent trimethylsiloxy units, (c) 8.2 parts of trimethylolpropanetrimercaptoprop-rionate, and (d) 2.9 parts of the photoinitiator as described in (c) of Composition IV.

Composition XIX (a) 91.8 parts of the dimethylvinylsiloxy endblocked polymethylphenylsiloxane having a degree of polymerization of about 50, (b) 45 parts of a siloxane resin having 85 mole percent monophenylsilsesquioxane units 8.2 mole dimethylvinylsiloxy units, and 6.8 mole percent trimethylsiloxy units, (c) 8.2 parts of trimethylolpropanetrimercaptoprop-rionate, and (d) 2.9 parts of the photoinitiator as described in (c) of Composition IV.

Each of the above compositions were exposed to UV radiation in the amounts of energy stated in Table VIII. After the compositions were cured, the tensile strength at break, the elongation at break, and the 50% modulus was measured and the values observed were as shown in Table VIII.

TABLE VIII

| COMPO-SITION | UV ENERGY mJ/cm$^2$ | TENSILE kPa | ELONGATION % | MODULUS kPa |
|---|---|---|---|---|
| XV | 10 | 483 | 170 | 134.4 |
| XV | 24 | 621 | 175 | 158.6 |
| XV | 50 | 827 | 200 | 165.5 |
| XV | 224 | 655 | 160 | 167.5 |
| XVI | 50 | 552 | 120 | 234.4 |
| XVI | 225 | 517 | 115 | 220.6 |

TABLE VIII-continued

| COMPO-SITION | UV ENERGY mJ/cm² | TENSILE kPa | ELONGA-TION % | MODULUS kPa |
|---|---|---|---|---|
| XVII | 50 | 448 | 245 | 117.2 |
| XVII | 225 | 483 | 205 | 151.7 |
| XVIII | 50 | 517 | 180 | 165.5 |
| XVIII | 225 | 655 | 200 | 179.3 |
| XIX | 50 | 793 | 230 | 179.3 |
| XIX | 225 | 827 | 205 | 220.6 |

That which is claimed is:

1. An article comprising a substrate having at least a surface of a composition in the cured state in which the composition comprises a material which is storable in one package, is viscosity stable indicated by the failure of the 25° C. viscosity to double when heated at 100° C. for 24 hours, cured when exposed to ultraviolet radiation of 70 millijoules or less per square centimeter in one second or less where the ultraviolet radiation includes a wavelength of 365 nanometers, and is obtained by mixing (A) a mixture of at least one polydiorganosiloxane having a low alkenyl radical content and at least one polydiorganosiloxane having a high alkenyl radical content wherein the polydiorganosiloxanes are alkenyl functional, linear triorganosiloxy endblocked polydiorganosiloxane having a degree of polymerization of 30 to 1,000 where each silicon-bonded organic radical is selected from the group consisting of vinyl, methyl, phenyl, 3,3,3-trifluoropropyl, beta-(cyclohexenyl)ethyl, ethyl, cyclohexenyl, allyl, high alkenyl radicals represented by the formula $-R^*(CH_2)_tCH=CH_2$ where $R^*$ is $=(CH_2)_s-$ or $-(ch_2)_tCH=CH$, r has a value of 1, 2, or 3; s has a value of 3 or 6; and t has a value or 3, 4, or 5, and silacyclopentenyl, and having per molecule at least two silicon-bonded organic radicals selected from the group consisting of vinyl, beta-(cyclohexenyl)ethyl, cyclohexenyl, allyl, higher alkenyl radical, and silacyclopentenyl, (B) mercapto functional crosslinker which is at least one material selected from the group consisting of mercapto functional polyorganosiloxanes and mercapto organic compounds, said mercapto functional polyorganosiloxanes are represented by the general formula $$R''R'_2SiO(R'''R'SiO)_x(R'RSiO)_ySiR'_2R''$$

wherein each R is a mercaptoalkyl radical having from 2 to 6 carbon atoms per radical; each R' is selected from the group consisting of methyl, phenyl, 3,3,3-trifluoropropyl, and ethy; and each R'' is a radical selected from the group consisting of —OH, R, and R'; and each R''' is methyl or phenyl, on the average there being per molecule at least two mercaptoalkyl radicals, x is 0 or great, y is 0 or greater, and the amount and kind of organic radicals represented by R, R', R'', or R''' being of such a nature as to make (A) and (B) compatible, and said mercapto organic compounds have at least two mercapto groups per molecule, consisting of atoms of sulfur, carbon, and hydrogen, and optionally oxygen, having a molecular weight less then 1,000 and being of such a nature as to make (A) and (B) compatible, (C) photosensitizer, and (D) storage stabilizer there being in said material from 0.5 to 1.5 total alkenyl radicals per mercapto group.

2. The article according to claim 1 in which the substrate is glass.

3. The article according to claim 2 in which the glass is an optical fiber.

4. The article according to claim 3 in which the cured composition is a primary coat.

* * * * *